United States Patent [19]

Yamane

[11] 4,272,959
[45] Jun. 16, 1981

[54] DIAPHRAGM BREAKAGE CONDITION DETECTING DEVICE FOR A PRESSURE CONTROL DEVICE

[75] Inventor: Ken Yamane, Yokohama, Japan

[73] Assignee: Nissan Motor Company, Limited, Japan

[21] Appl. No.: 107,457

[22] Filed: Dec. 26, 1979

[30] Foreign Application Priority Data

Jan. 20, 1979 [JP] Japan .................................. 54-5433

[51] Int. Cl.³ ..................... F02D 23/00; G08B 21/00
[52] U.S. Cl. ................................. 60/602; 200/81 R; 200/83 C; 200/83 Q; 340/605; 340/626
[58] Field of Search ............... 340/606, 611, 614, 626, 340/605; 60/598, 600, 601, 602; 200/81 R, 83 C, 83 Q; 73/40, 49.2

[56] References Cited

U.S. PATENT DOCUMENTS

| | | | |
|---|---|---|---|
| 1,338,197 | 4/1920 | Spencer et al. | 340/614 X |
| 2,230,961 | 2/1941 | Lewis | 340/626 X |
| 2,683,782 | 7/1954 | Corssen | 340/626 X |
| 3,041,834 | 7/1962 | Davies et al. | 73/40 X |
| 3,096,614 | 7/1963 | Silver et al. | 60/602 |
| 3,239,827 | 3/1966 | Werner et al. | 340/626 X |
| 3,389,553 | 6/1968 | Hardy et al. | 60/602 X |
| 3,439,356 | 4/1969 | Kinzer | 340/626 |
| 3,505,741 | 4/1970 | Breslin | 340/626 X |
| 3,906,729 | 9/1975 | Connor et al. | 60/600 |
| 3,944,769 | 3/1976 | Wagner | 340/605 X |

FOREIGN PATENT DOCUMENTS

796624  1/1936  France ...................................... 340/626

Primary Examiner—John W. Caldwell, Sr.
Assistant Examiner—Daniel Myer
Attorney, Agent, or Firm—Lane, Aitken, Ziems, Kice & Kananen

[57] ABSTRACT

A diaphragm type actuator with a breakage condition detecting function which comprises a diaphragm member partitioning a casing into a first chamber filled with a high pressure and a second chamber exposed to air, and a breakage detecting switch supported by a displaceable partitioning member, such as, bellows, provided on the inner wall of the first chamber so as to define a third chamber filled with a high pressure, whereby if there occurs breakage in the diaphragm, the breakage detecting switch mounted on the bellows moves towards the diaphragm member to become in contact with an actuating rod supported by the diaphragm member to detect the breakage in the diaphragm member.

5 Claims, 2 Drawing Figures

DIAPHRAGM BREAKAGE CONDITION DETECTING DEVICE FOR A PRESSURE CONTROL DEVICE

BACKGROUND OF THE INVENTION

The present invention relates to a diaphragm type actuator, and more particularly to a diaphragm breakage condition detecting device for a pressure control device.

In general, with a conventional diaphragm type actuator, it is impossible to directly detect breakage in the diaphragm member. It is only possible to indirectly detect the breakage in the diaphragm member in accordance with a phenomenon appeared in the event that there occurs breakage in the diaphragm member whereby the actuator becomes out of order.

Referring to FIG. 1, there is shown an internal combustion engine 10 with a turbo charger. There is provided an air valve 12 in an intake passage 14 connected to an intake manifold 16 of the engine 10. In order to constitute a turbo charger designated by reference numeral 30, there are provided a blower 32 of a compressor in the entrance of the intake passage 14 and a turbine 34 in an exhaust passage 20 connected to the exit of an exhaust manifold 18, wherein the blower 32 is directly connected to the turbine 34 by a shaft 36 so as to rotate simultaneously.

Reference numeral 22 denotes a bypass passage provided so as to bypass the exhaust passage 20, whereby a part of exhaust air is conducted through the bypass passage 22.

In order to control the amount of exhaust air through the bypass passage 22, there is provided an exhaust bypass valve 24 actuated by a diaphragm type actuator 40. The conventional diaphragm type actuator 40 comprises a casing 42, a diaphragm member 44 partitioning the casing 42 into a first chamber 46 and a second chamber 48 exposed to air, an actuating rod 50 the one end of which is mounted on the diaphragm member 44 while the other end thereof is connected to the exhaust bypass valve 24, and a compression spring 50 disposed between the diaphragm member 44 and the inner wall of the casing 10.

As seen from FIG. 1, the diaphragm type actuator is constituted so that an output pressure $P_1$ at the exit of the compressor 32 is supplied to the first chamber 46.

In operation, when the pressure $P_1$ at the exit of the compressor 32 is below the predetermined value prescribed by the normal operation of the turbo charger 30, the diaphragm member 44 is held at the initial position or moves in the right direction thereof depending on the pressure differentials between the output pressure $P_1$ and the repulsive force of the compression spring 52. Thereby, the exhaust bypass valve 24 provided in the bypass passage 22 opens in accordance with the pressure differentials. Thus, the diaphragm type actuator makes it possible to suppress the output pressure $P_1$ at the exit portion of the blower 32 so as not to exceed the upper value, such as, about 1.5 atmospheric pressure. Thereby, it is possible to prevent the excessive rotation of the turbo charger.

Meanwhile, the exhaust temperature is very high, such as 700°-800° C. Accordingly, with the diaphragm type actuator 40 shown in FIG. 1, the diaphragm 44 usually made of rubber is apt to be broken because of heat conducting through the actuating rod 50.

In the event that there occurs breakage in the diaphragm 44, the pressure of the first chamber 46 filled with a high pressure is lowered, the exhaust bypass valve 24 is held at the closed position. As a result, this makes it impossible to regulate the pressure $P_1$ at the exit portion of the compressor 32. Thereby, it becomes impossible to prevent the excessive rotation of the turbo-charger 30.

In the prior art, in order to determine the occurence of the above inconvenience, an attempt is made to provide a pressure meter for indicating the pressure $P_1$ at the exit of the compressor, and/or alarm lamp or an alarm buzzer for alarming the excessive elevation of the pressure sensed by the pressure meter.

However, with this attempt, it is impossible to detect the breakage in the diaphragm until the pressure $P_1$ at the exit of the compressor 32 excessively elevates. Accordingly, it is impossible to prevent damage or breakage in the internal combustion engine or turbo-charger prior to occurrence of the same. Further, it is also impossible to precisely judge the cause of the excessive elevation of the pressure.

In view of this, another attempt is made to provide a safety valve at the exit of the compressor, thereby, when the pressure is excessively elevates, to feedback a part of air at the exit of the compressor to the entrance of the compressor or let the same being escaped from an opening exposed to air.

However, if this attempt is applied to an internal combustion engine in which a carburetor is provided upstream of the compressor, a mixture being supplied from the carburetor is emitted to the atmosphere through the safety valve. As a result, this may produce the atmospheric pollution, the varitation of air/fuel ratio, and poor fuel economy. Accordingly, if this attempt is applied to the internal combustion engine in which a carburetor is provided upstream of the compressor, there remains drawback that the turbo-charger is injured or damaged.

SUMMARY OF THE INVENTION

With the above in mind, an object of the present invention is to provide a diaphragm breakage condition detecting device for a pressure control device which makes it possible to directly detect the breakage in the diaphragm member.

Another object of the present invention is to provide a diaphragm breakage condition detecting device for a pressure control device which makes it possible to eliminate accidents or troubles which may be followed by the breakage of the diaphragm prior to occurrence of accidents or troubles.

A further object of the present invention is to provide a diaphragm breakage condition detecting device for a pressure control device suitable for use as an actuating means for actuating an exhaust bypass valve provided in an internal combustion engine with a turbo-charger.

BRIEF DESCRIPTION OF THE DRAWINGS

The features and advantages of the diaphragm breakage condition detecting device for a pressure control device according to the present invention will become more apparent from the following detailed description taken in conjunction with the accompanying drawings, in which.

In these drawings, the same reference numerals indicate the same or similar elements of the diaphragm breakage condition detecting device.

DETAILED DESCRIPTION OF THE PREFERRED EMBODIMENT OF THE PRESENT INVENTION

Figure 1:
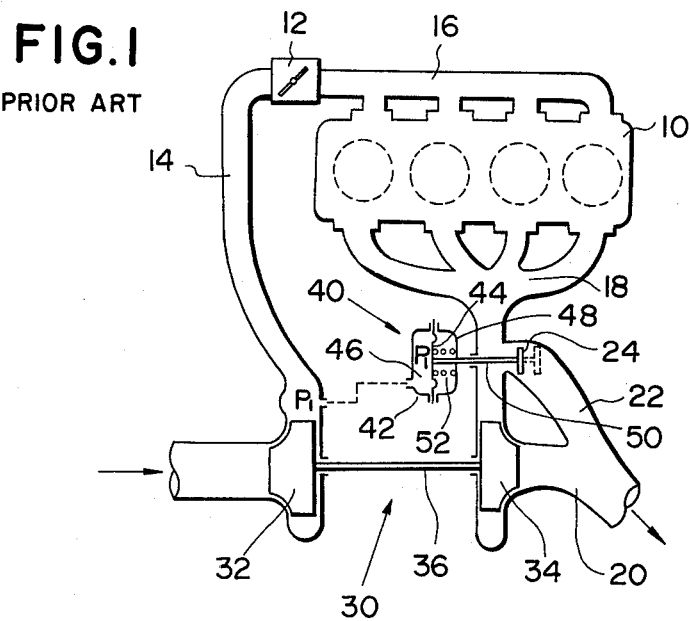
FIG. 1 is a schematic view illustrating a conventional diaphragm type actuator for controlling an exhaust bypass valve provided in an exhaust bypass passage of an internal combustion engine with a turbo-charger.
Figure 2:
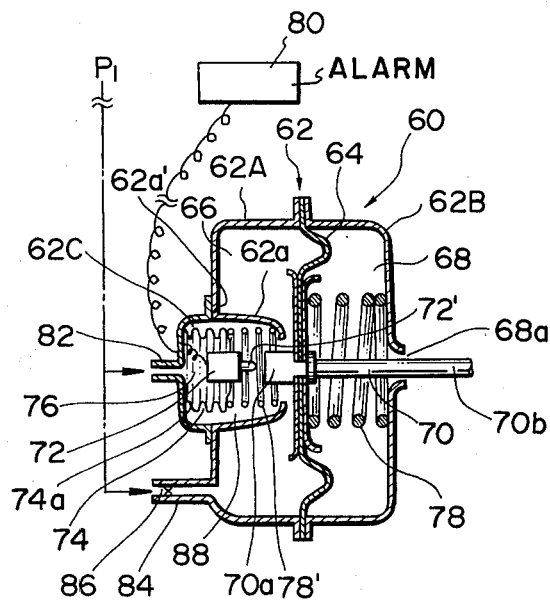
FIG. 2 is a sectional view schematically illustrating a diaphragm breakage condition detecting device for a pressure control device according to the present invention.

Referring to FIG. 2, there is shown a diaphragm breakage condition detecting device 60 for a pressure control device comprises a casing 62 comprising first, second, and third casing members 62A, 62B, and 62C, a diaphragm member 64 pertitioning the casing 62 into a first chamber 66 and a second chamber 68, wherein the second chamber 68 is formed with an opening 68a exposed to air. The diaphragm breakage condition detecting device 60 further comprises an actuating rod 70 one end 70a of which is supported by the diaphragm member 64, while the other end 70b thereof extends towards exterior of the casing 62 through the opening 68a, and a breakage detecting switch 72 supported by a displaceable partitioning member 74, such as bellows, which is at the bottom portion 74a thereof mounted on an inner wall of the third casing member 62C. Thus, a third chamber 76 is defined by the bellows 74 and the inner wall of the casing member 62C.

In more detail, reference numeral 78 denotes a compression spring interposed between the diaphragm member 64 and the inner wall of the first casing member 62B. Reference numeral 62a denotes an arcuated bent portion inwardly projected from the portion 62a adjacent with the upper and lower ends of the third casing member 64C. Reference numeral 78' denotes a compression spring interposed between the top of the bellows 74 and the inner end of the arcuated bent portion 62a.

Reference numeral 80 denotes an alarm device electrically connected to the breakage detecting switch 72 to become operative when the breakage detecting switch 72 becomes in contact with the actuating rod 70 the reason for which will be described later in more detail.

The output pressure $P_1$ at the exit of the compressor 32 is conducted into the first and third chambers 66 and 76 through first and second inlets 82 and 84, respectively. In the embodiment, an orifice 86 is provided in the second inlet 84 for the purpose of relaxing the fluctuation of the output pressure $P_1$ at the exit of the compressor 32. Similarly, an orifice may be provided in the first inlet 82.

In operation, in the normal condition where there is no breakage in the diaphragm member 64, the pressure within the first chamber 66 is equal to that within a fourth chamber 88 defined by the inner wall of the arcuated projection 62a and the outer surface of the bellows 74. Accordingly, the bellows 74 is maintained at the portion determined by the modulus of the elasticity of the compression spring 78'.

However, in the event that there occurs breakage in the diaphragm member 64, the first chamber 66 communicates with the second chamber 68 through the portion of the breakage in the diaphragm member 64. As a result, a high pressure within the first chamber 66 escapes therefrom to the second chamber 68, with the result that the pressure within the first chamber 66 is lowered. Accordingly, the diaphragm member 64 moves in the left direction by the force of the compression spring 78. On the other hand, the bellows 74 extends toward the diaphragm member 64 against the force of the compression spring 78'. Thereby, the breakage detecting switch 72 moves in the right direction. As a result, the contact 72' of the breakage detecting switch 72 becomes in contact with the end surface of the one end 70a of the actuating rod 70. Accordingly, the alarm device 80 becomes operative in response to the breakage detecting switch 72. Thus, it becomes known that the diaphragm member 64 has been broken.

As is clear from the foregoing description, a diaphragm breakage condition detecting device according to the present invention makes it possible to detect the breakage occurred in the diaphragm as soon as occurrence of the breakage therein. Accordingly, with the diaphragm breakage detecting device according to the present invention, it is possible to securely eliminate serious inconveniences which may be caused by the breakage of the diaphragm member.

It is to be understood that modification and variations of the embodiments of the present invention disclosed herein may be resorted to without departing from the spirit of the invention and the scope of the appended claim.

What is claimed is:

1. A diaphragm breakage condition detecting device for a pressure control device comprising:
   (a) a casing (62),
   (b) a diaphragm member (64) pertitioning the casing (62) into a first chamber (66) and a second chamber (68), said second chamber (68) having an opening (68a) exposed to air,
   (c) a compression spring (78) interposed between the diaphragm member (64) and the inner wall of said casing (62) within said second chamber (68).
   (d) an actuating rod (70) one end of which is supported by said diaphragm member (64), while the other end thereof extends towards exterior of said casing (62) through said opening (68a),
   (e) a breakage detecting switch (72) supported by a displaceable partitioning member (74) which is at the bottom portion thereof mounted on an inner wall of said second chamber (68), which is opposite to said diaphragm member (64),
   (f) a third chamber (76) defined by said displaceable partitioning member (74) and the inner wall of said casing (62),
   (g) a control vacuum $P_1$ supplied into said first and third chambers (66, 76),
   whereby, if there occurs breakage in said diaphragm member 64, said breakage detecting switch (72) mounted on said displaceable partitioning member (74) moves towards said diaphragm member (64) to become in contact with the one end of said actuating rod (70), thereby to become operative to detect the breakage in said diaphragm member (64).

2. A diaphragm breakage condition detecting device for a pressure control device as defined in claim 1, which further comprises an alarm device 80 responsive to the operation of said breakage detecting switch 72.

3. A diaphragm breakage condition detecting device for a pressure control device as defined in claim 1 or 2, wherein there is provided a projecting means 62a projected from the inner wall of said casing 62 within said first chamber 66, a compression spring 78' being interposed between the inner end of the projecting means 62a and the top end of said displaceable partitioning member 74 consisting of a bellows.

4. A diaphragm breakage condition detecting device for a pressure control device as defined in claim 3, wherein said actuating rod 70 is at the other end thereof connected to an exhaust bypass valve 24 provided in an exhaust bypass passage 22 of an internal combustion engine 10 with a turbo charger 30 and said control pressure is an output pressure of a compressor provided in the turbo charger 30.

5. A diaphragm breakage condition detecting device for a pressure control device as defined in claim 1 or 2, wherein said actuating rod 70 is at the other end thereof connected to an exhaust bypass valve 24 provided in an exhaust bypass passage 22 of an internal combustion engine 10 with a turbo charger 30 and said control pressure is an output pressure of a compressor provided in the turbo charger 30.

* * * * *